J. G. HACKING.
WATER POWER APPARATUS.
APPLICATION FILED NOV. 20, 1920.
1,422,700.
Patented July 11, 1922.
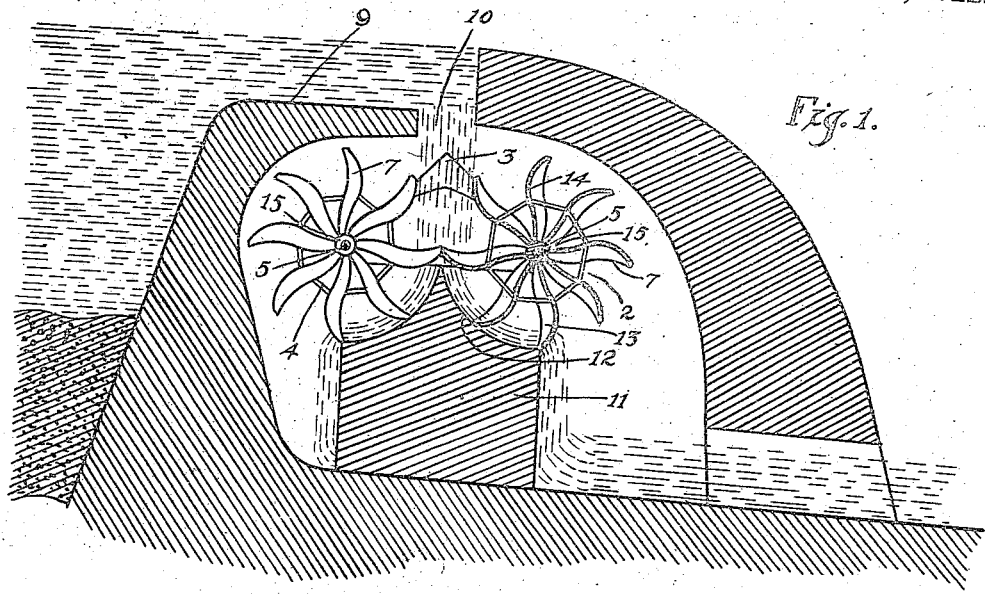
Fig. 1.
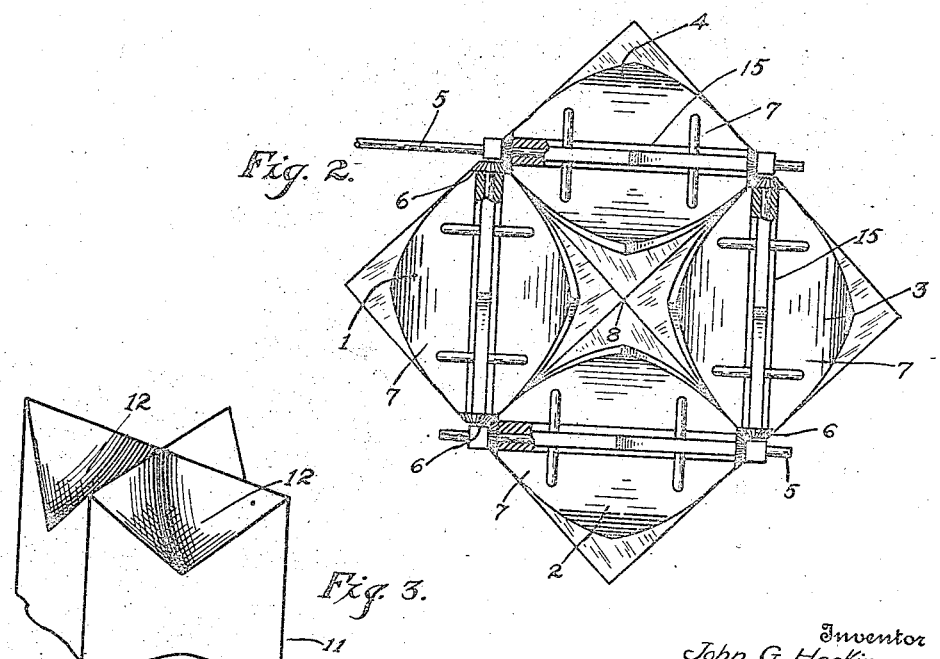
Fig. 2.
Fig. 3.
Inventor
John G. Hacking
By Whittemore Hulbert & Whittemore
Attorneys

UNITED STATES PATENT OFFICE.

JOHN G. HACKING, OF DETROIT, MICHIGAN, ASSIGNOR OF ONE-HALF TO WALTER GUDITH, OF DETROIT, MICHIGAN.

WATER-POWER APPARATUS.

1,422,700.  Specification of Letters Patent.  Patented July 11, 1922.

Application filed November 20, 1920. Serial No. 425,306.

*To all whom it may concern:*

Be it known that I, JOHN G. HACKING, a citizen of the United States of America, residing at Detroit, in the county of Wayne and State of Michigan, have invented certain new and useful Improvements in Water-Power Apparatus, of which the following is a specification, reference being had therein to the accompanying drawings.

The invention relates to water power apparatuses and is designed for use particularly in locations where there is a limited head of water. One object of the invention is to provide an apparatus having a plurality of water wheels having buckets which are rotatable through adjacent paths and the adjacent edges of which are adapted to receive the falling water. Another object is to provide a plurality of cooperating water wheels which are connected to each other and have interfitting buckets. A further object is to provide a guide for the water through a portion of the rotation of the water wheels. The invention has among other objects the novel features of construction as more fully hereinafter set forth.

In the drawings:

Figure 1 is a transverse section showing the water power apparatus embodying my invention in operative position;

Figure 2 it a top plan view of the water power apparatus;

Figure 3 is a perspective view of the water guide.

My water power apparatus comprises the plurality of cooperating water wheels 1, 2, 3 and 4 which are mounted upon the shafts 5. These shafts are connected to each other by suitable means such as the bevel gears 6. The water wheels have the V-shaped buckets 7, the apices of which are adapted to pass adjacent to a common point 8 so that the combined buckets produce a substantially continuous surface.

9 is a suitably constructed dam having the aperture 10 in its upper wall for permitting water to fall upon the portions of the buckets near their adjacent apices. 11 is a guide having V-shaped curved surfaces 12 which extend adjacent to the outer edges of the buckets 7 from a point below and adjacent to the common point 8 and terminate at points substantially below the respective shafts of the wheels, the arrangement being such that the water upon the buckets is maintained in engagement therewith through substantially a quarter of the rotation of each wheel.

For the purpose of re-inforcing the buckets and at the same time forming the same to assist in holding the flowing water, they are dished as at 13 and have the side flanges 14, the inner ends of these buckets being suitably secured to the hubs 15 which are splined upon the shafts 5.

From the above description it will be readily seen that I have provided a water power apparatus in which the water falls upon interfitting buckets producing a substantially continuous surface so that substantially all of the falling water assists in rotating the water wheels. Furthermore, the guide below the plane of the axes of the water wheels assists in maintaining the water in engagement with the buckets during the time the water is moving downwardly to points below the extreme ends of the lowermost buckets.

What I claim as my invention is:

1. The combination with three or more wheels having complementary interfitting buckets rotatable through adjacent paths, of means for directing a moving fluid upon the apices of said buckets.

2. The combination with three or more wheels having complementary interfitting buckets rotatable through adjacent paths, of means for directing a moving fluid upon the apices of said buckets, and driving connections between said buckets.

3. The combination with a dam having a passageway therethrough for falling water, of three or more mechanically connected shafts, and wheels respectively fixed on said shafts and provided with complementary interfitting buckets rotatable through adjacent paths whereby the falling water from the dam will simultaneously engage the apices of said buckets.

4. The combination with a plurality of wheels having cooperating interfitting V-shaped buckets, of means for mechanically connecting said wheels to each other.

5. The combination with a plurality of wheels having complementary interfitting buckets, of a guide having surfaces correspondingly shaped to the edges of said buckets and extending adjacent thereto, through a portion of their rotation, said surfaces extending from a point adjacent to the meeting edges of all of said buckets.

6. The combination with wheels having interfitting V-shaped buckets, of a guide having correspondingly V-shaped surfaces extending adjacent to the outer edges of said buckets and from a point adjacent to the meeting edges of all of said buckets.

7. The combination with a dam having an aperture thereinto for the passage of falling water, of a plurality of wheels having interfitting V-shaped buckets with their apices arranged beneath said aperture in the dam, and a guide for the falling water having V-shaped surfaces concentric with said wheels and extending adjacent to the outer edges of the buckets from a point adjacent to the apices thereof to points approximately beneath the axes of said wheels.

In testimony whereof I affix my signature.

JOHN G. HACKING.